United States Patent [19]

Honda

[11] Patent Number: 5,203,224
[45] Date of Patent: Apr. 20, 1993

[54] GEAR FOR USE IN VACUUM SPACE

[75] Inventor: Toshio Honda, Yokohama, Japan

[73] Assignee: Kabushiki Kaisha Toshiba, Kawasaki, Japan

[21] Appl. No.: 828,166

[22] Filed: Jan. 30, 1992

[30] Foreign Application Priority Data

Jan. 30, 1991 [JP] Japan ..................... 3-9706

[51] Int. Cl.$^5$ .................. F16H 55/06; F16H 57/04
[52] U.S. Cl. .................. 74/468; 74/460; 74/464
[58] Field of Search .......... 74/460, 461, 464, 468; 384/907

[56] References Cited

U.S. PATENT DOCUMENTS

| | | | |
|---|---|---|---|
| 3,664,886 | 5/1972 | Pedersen | 74/214 X |
| 4,825,720 | 5/1989 | Capdepuy | 74/468 X |

FOREIGN PATENT DOCUMENTS

| | | | |
|---|---|---|---|
| 0250283 | 12/1987 | European Pat. Off. | |
| 63-83284 | 4/1988 | Japan | 74/468 |
| 1-116377 | 5/1989 | Japan | 74/468 |
| 1-120481 | 5/1989 | Japan | 74/468 |
| 1-149058 | 10/1989 | Japan | |
| 1-261561 | 10/1989 | Japan | |
| 2056583 | 3/1981 | United Kingdom | 384/907 |

OTHER PUBLICATIONS

Patent Abstracts of Japan, vol. 12, No. 312, (C-523), Aug. 24, 1988, & JP-A-63 083 284, Apr. 13, 1988, T. Hattori, et al., "Sliding Member Having Superior Damping Capacity".

Primary Examiner—Allan D. Herrmann
Attorney, Agent, or Firm—Oblon, Spivak, McClelland, Maier & Neustadt

[57] ABSTRACT

The peripheral teeth of a gear body are made of alloy tool steel and coated with a manganese-phosphate-treated layer and then with a solid lubricating film. The alloy tool steel of which the teeth of the gear body cooperates with the manganese phosphate layer to act on the solid lubricating film. The taking-in force of the solid lubricating film can be thus increased at the surface thereof. The bonding strength of the solid lubricating film can be increased as well. This can prevent the solid lubricating films on teeth of the two gear bodies engaged from being separated from each other.

10 Claims, 4 Drawing Sheets

GEAR FOR USE IN VACUUM SPACE

BACKGROUND OF THE INVENTION

1. Field of the Invention

The present invention relates to a gear for use in gear transmission systems built in vacuum environment such as in space.

2. Description of the Related Art

In the case of this gear intended to use in vacuum environment, its gear body must be usually made of stainless steel, nitrided steel or others having a relatively long life even if it is used together with its paired one without any lubricating matter. This is because the space in which it is used is vacuum and also because the use of any lubricating matter such as grease is difficult there. Particularly when it is used in the field of space development, a solid lubricating film consisting of mainly gold, silver, molybdenum disulfide or others must be formed on those teeth of it which will be engaged with teeth of its paired gear to keep them lubricated while they are turning. This is because it is quite difficult to check and maintain them and also because it is required that they will be highly durable under vacuum circumstances and against high load added and that they will not contaminate any other components at their peripheral region.

Machines and devices which will be launched into space by the spacecraft have been made larger and larger in size these days in the field of space development. As they become larger in size, load unexpectedly higher is sometimes added to the gear transmission system at the drive section for their space manipulators, for example. It is therefore required that those gears which will be used as components of the gear transmission system in space can be kept reliably operative for a long time under this unexpectedly high load added.

When high load is added to the above-described gears, however, their solid lubricating films become liable to separate from each other, thereby making it difficult to keep them reliably operative for a long time.

SUMMARY OF THE INVENTION

The object of the present invention is therefore to provide a gear for use in vacuum space having on it a solid lubricating film not separated from that on another gear engaged to lubricate the gears, so that they are durable for a longer time even under unexpectedly high load added in vacuum space.

This object of the present invention can be achieved by a gear for use in vacuum space comprising a gear body made of alloy tool steel and having teeth, a manganese-phosphate-treated layer formed on the gear body, and a solid lubricating film formed on the manganese phosphate layer.

According to this gear of the present invention, the alloy tool steel of which the gear body is made can cooperate with the manganese phosphate layer on the gear body. The taking-in force of the solid lubricating film can be thus increased at the surface thereof and the bonding strength of it can be increased as well. The solid lubricating film on the gear body can be therefore prevented from separating from that on another gear body engaged to thereby make them more durable for a longer time.

DETAILED DESCRIPTION OF THE PREFERRED EMBODIMENTS

Some embodiments of the present invention will be described in detail with reference with the accompanying drawings.

Figure 1:
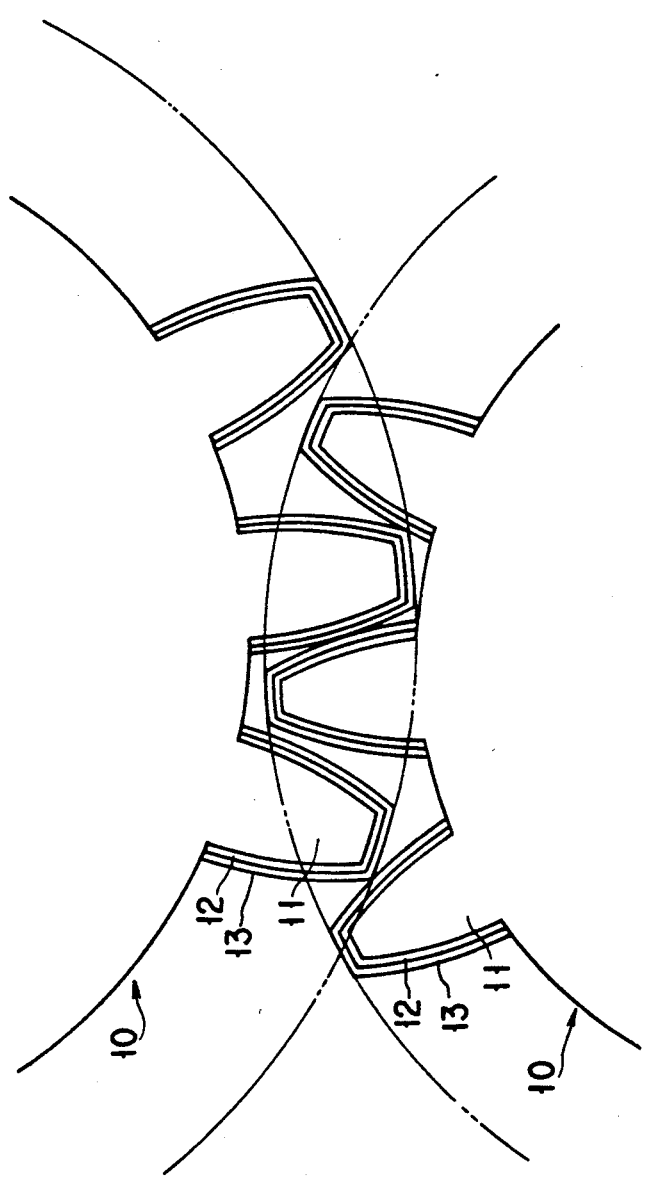
FIG. 1 is a schematic view showing gears engaged with each other, each gear being an embodiment of the present invention and intended to use in vacuum environment.

FIG. 1 shows gears engaged with each other, each gear being an embodiment of the present invention and intended to use in vacuum environment. At least teeth 11 of each gear body 10 are made of alloy tool steel. The alloy tool steel has a composition containing each of C, Si, Mn, Cr, Mo, P, S and V at a predetermined amount. A first manganese phosphate layer 12 is formed on each of teeth 11 of the gear body 10. A second solid lubricating film 13 consisting of molybdenum disulfide, gold, silver and others is formed on the first manganese phosphate layer 12. The first manganese phosphate layer 12 cooperates with the alloy tool steel, of which the teeth 11 of the gear body 10 are made, to increase the taking-in force of the second solid lubricating film 13. The bonding of the solid lubricating film 13 can be thus increased at the surface thereof. The second solid lubricating films 13 on the teeth 11 of both gear bodies 10 engaged can be thus prevented from separating from each other.

Figure 2:
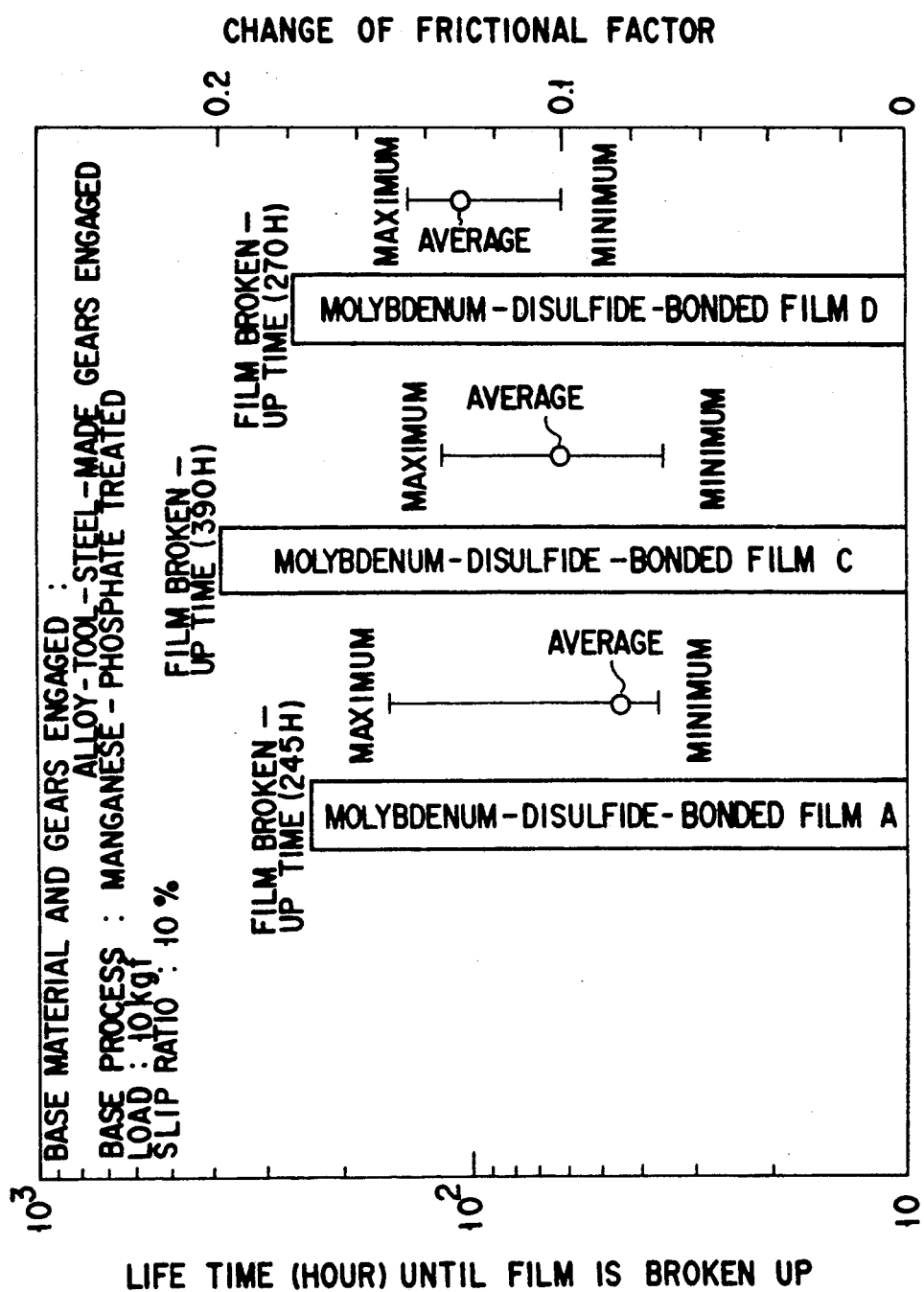
FIG. 2 is a characteristic graph showing lubricities of the gears shown in FIG. 1.

This merit was confirmed by the following test wherein it was examined how the gears wore out. Three kinds of molybdenum-disulfide-bonded films A, C and D were prepared using molybdenum disulfide as their main lubricant but different in composition depending upon organic binders used. These molybdenum-disulfide-bonded films A, C and D were used as the second solid lubricating film 13 formed on the first manganese phosphate layer 12. Each paired gears having one of these molybdenum-disulfide-bonded films A, C and D were rolled and slid in vacuum and at normal temperature, having a load plane pressure of 60 kgf under a load of 10 kgf, a slip ratio of 10% and a relative slip speed of 0.26 m/s. Results thus obtained are shown in FIG. 2. It was confirmed that the bonded films A, C and D had life times of 245 hours, 390 hours and 270 hours until they were broken up. It was also detected how the frictional factor of each paired gears changed.

Figure 3:
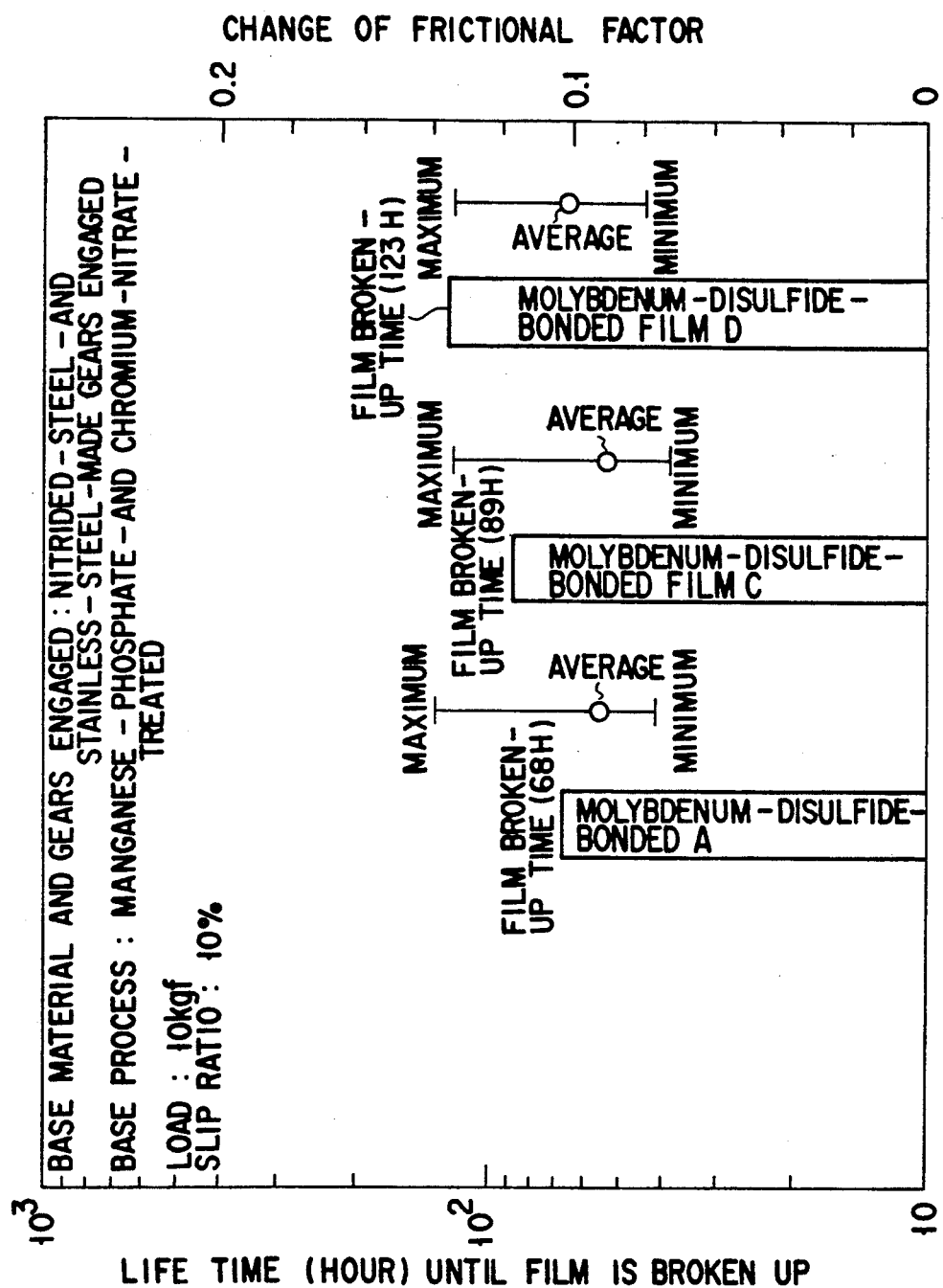
FIG. 3 is a characteristic graph showing lubricities of two gears engaged with each other, one of said gears being made of nitrided steel while the other of stainless steel and both of them having a first manganese phosphate layer and a second solid lubricating film formed on the first layer but their second solid lubricating films being different in composition.

Then, the manganese phosphate layer 12 was formed on each conventional gear made of nitrided steel and a chromium-nitrate-treated layer was formed on each gear made of stainless steel. Each of the molybdenumdisulfide-bonded films A, C and D was further formed, as the second solid lubricating film 13, on these gears of two kinds. They were rolled and slid same as described above. Results thus obtained are shown in FIG. 3. As apparent from FIG. 3, it can be understood that the bonded films A, C and D have life times of 68 hours, 89 hours and 123 hours until they are broken up and that their lives are, therefore, shorter as compared with those shown in FIG. 2. It can also be understood that the frictional factors change to a little greater extent in the cases of those paired gears coated with the molybdenum-disulfide-bonded films C and D in FIG. 3.

Figure 4:
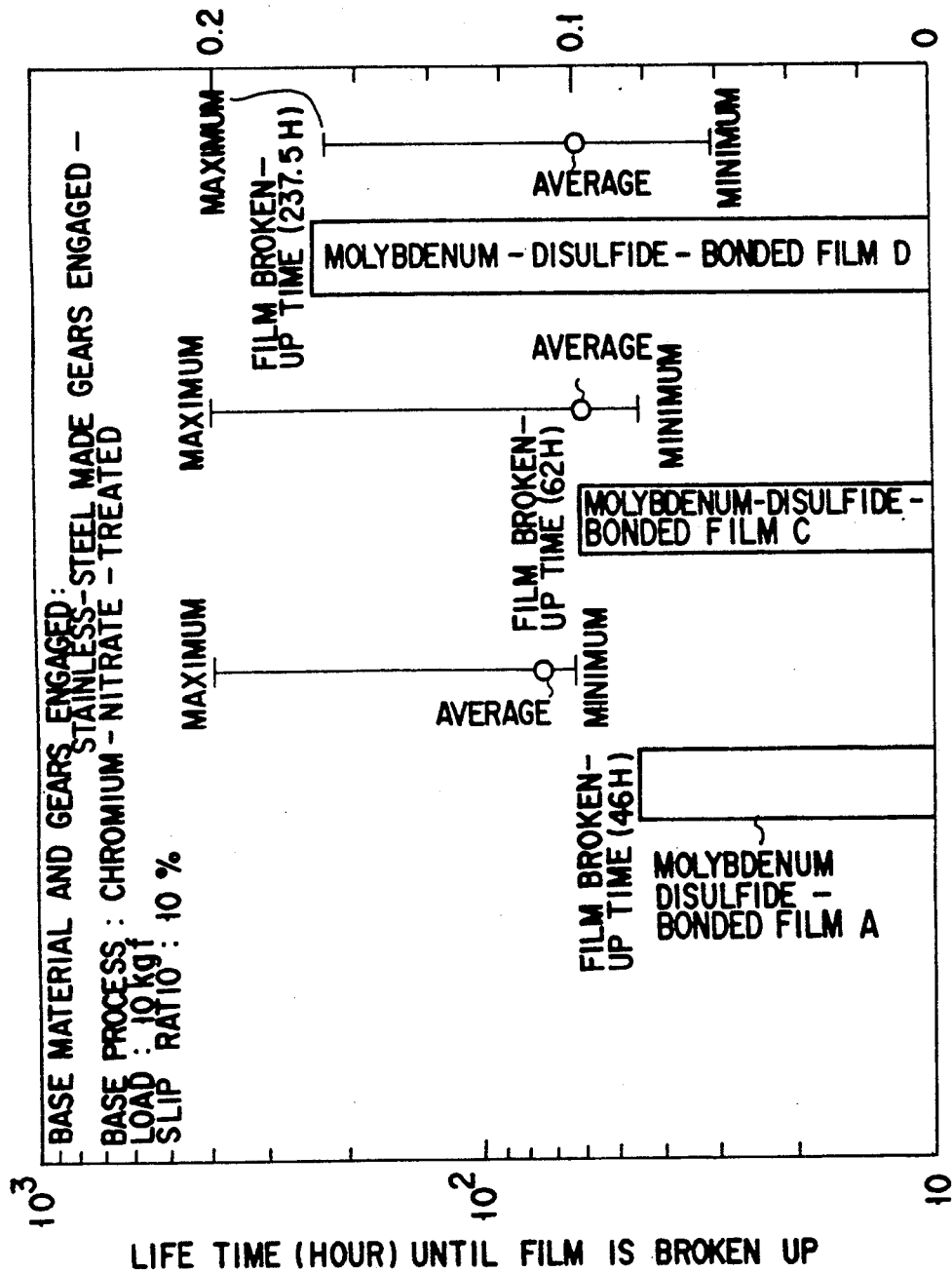
FIG. 4 is a characteristic graph showing lubricities of gears engaged with each other, each being made of stainless steel and having the first manganese phosphate layer and the second solid lubricating film formed on the first layer, but each second solid lubricating film being different in composition.

Further then, the chromium nitrate layer was formed on gears each made of stainless steel. Each of the molybdenum-disulfide-bonded films A, C and D was further formed, as the second solid lubricating film 13, on each paired gears which are to be engaged with each other. The pairs of these gears were tested same as described above. Results thus obtained are shown in FIG. 4. It can be understood from FIG. 4 that the bonded films A, C and D have life times of 46 hours, 62 hours and 237.5 hours until they are broken up and that their lives are, therefore, shorter as compared with those shown in FIG. 2. It can also be understood that each paired gears have a more unstable frictional factor.

According to the gear of the present invention which is intended to use in vacuum environment, at least teeth 11 of its gear body 10 are made of alloy tool steel. In addition, it has the first manganese phosphate layer 12 and the second solid lubricating film 13 formed on the layer 12. The alloy tool steel of which the teeth 11 of the gear body 10 are made can therefore cooperate with the manganese phosphate layer 12 to act on the second solid lubricating film 13. The taking-in force of the solid lubricating film 13 can be thus increased at the surface thereof and its bonding strength can be increased as well. The solid lubricating films 13 on the teeth 11 of the two gears 10 engaged can be therefore prevented from separating from each other and their lives can be made longer accordingly.

Although molybdenum disulfide has been used as the solid lubricating film 13 by the above-described gears, gold, silver or others may be used.

Although the teeth 11 of the gear body 10 have been made of alloy tool steel and coated with the manganese phosphate layer 12 and then with the solid lubricating film 13 in the above-described cases, the gear itself may be made of alloy tool steel and coated, on its surface, with the manganese phosphate layer 12 and then with the solid lubricating film 13. In other words, the present invention can achieve same merits even if only those portions of the teeth of the gear which is to be engaged with the other one are made of alloy tool steel and coated with the manganese phosphate layer 12 and then with the solid lubricating film 13.

Or the gear itself may be made of alloy tool steel and only those portions of its teeth which are to be engaged with teeth of the other gear may be coated with the manganese phosphate layer 12 and then with the solid lubricating film 13.

It should be understood, therefore, that the present invention is not limited to the above-described embodiments and that various changes and modifications can be made without departing from the spirit and scope of the present invention.

What is claimed is:

1. A gear for use in vacuum space, comprising:
    a gear body made of alloy tool steel and having teeth;
    a manganese phosphate layer formed on the surface of said gear body; and
    a solid lubricating film formed on the manganese-phosphate-treated layer.

2. The gear according to claim 1, wherein the solid lubricating film comprises molybdenum disulfide.

3. The gear according to claim 1, wherein said manganese phosphate layer and the solid lubricating film are formed on at least those portions of the teeth of said gear body which are to be engaged with the teeth of another gear.

4. The gear according to claim 3, wherein said solid lubricating film comprises molybdenum disulfide.

5. The gear according to claim 1, wherein the solid lubricating film comprises gold or silver.

6. The gear according to claim 1, wherein the solid lubricating film consists of molybdenum disulfide and an organic binder.

7. A gear for use in vacuum space comprising:
    a gear body having teeth, at least those portions of which are adapted to be engaged with the teeth of another gear and are made of alloy tool steel; and
    a manganese phosphate layer formed on these engaging portions of the teeth of said gear body; and
    a solid lubricating film formed on the manganese phosphate layer.

8. The gear according to claim 7, wherein said solid lubricating film comprises molybdenum disulfide in a major proportion.

9. The gear according to claim 7, wherein the solid lubricating film comprises gold or silver.

10. The gear according to claim 7, wherein the solid lubricating film consists of molybdenum disulfide and an organic binder.

* * * * *